3,034,339
TOOL FOR DETECTING PIPE LEAKS
Paul A. Gawlik, 425 Eldon, Corpus Christi, Tex., assignor of five percent to Paul P. Flusche, Corpus Christi, Tex.
Filed Oct. 17, 1957, Ser. No. 690,780
6 Claims. (Cl. 73—46)

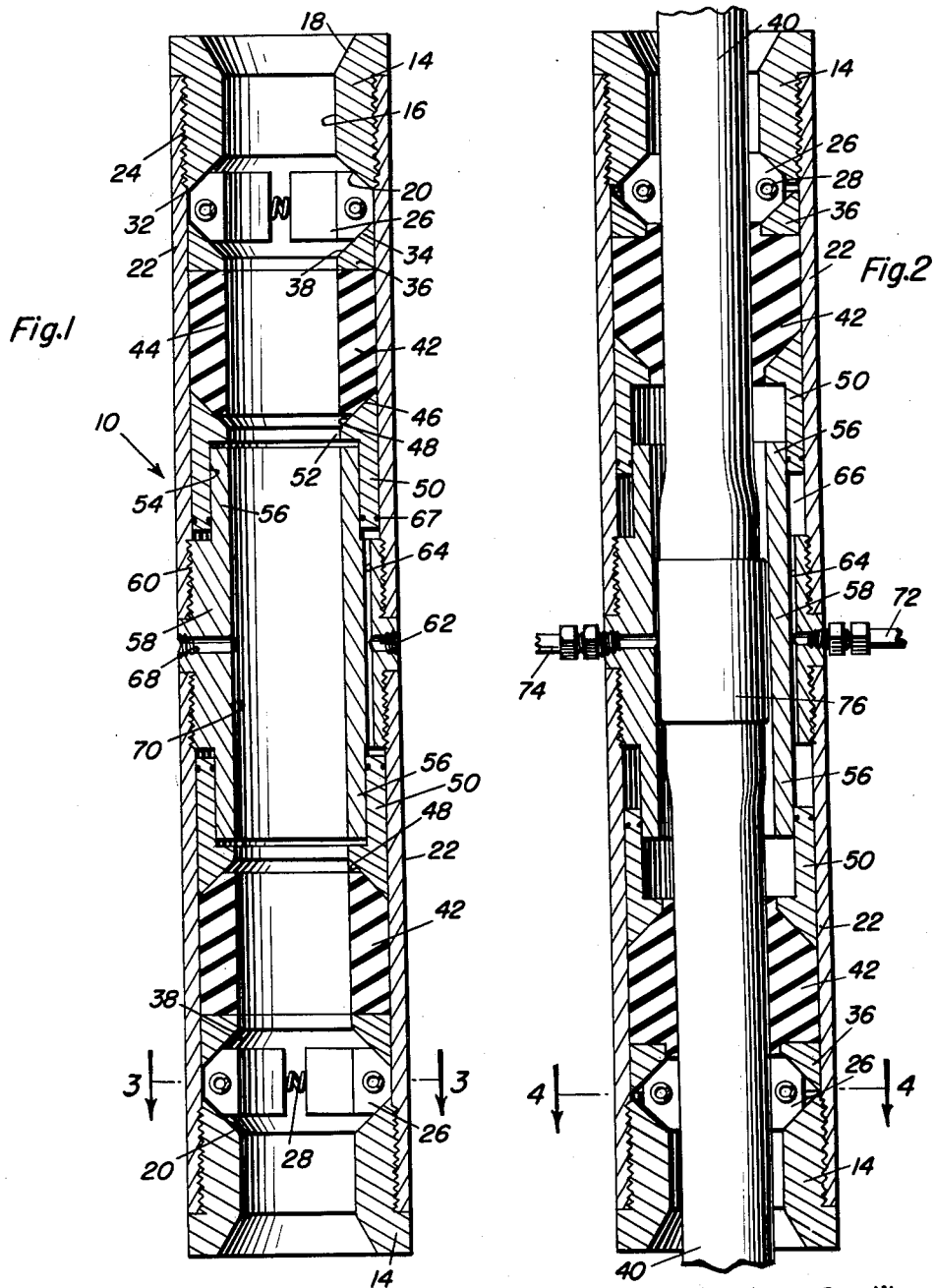

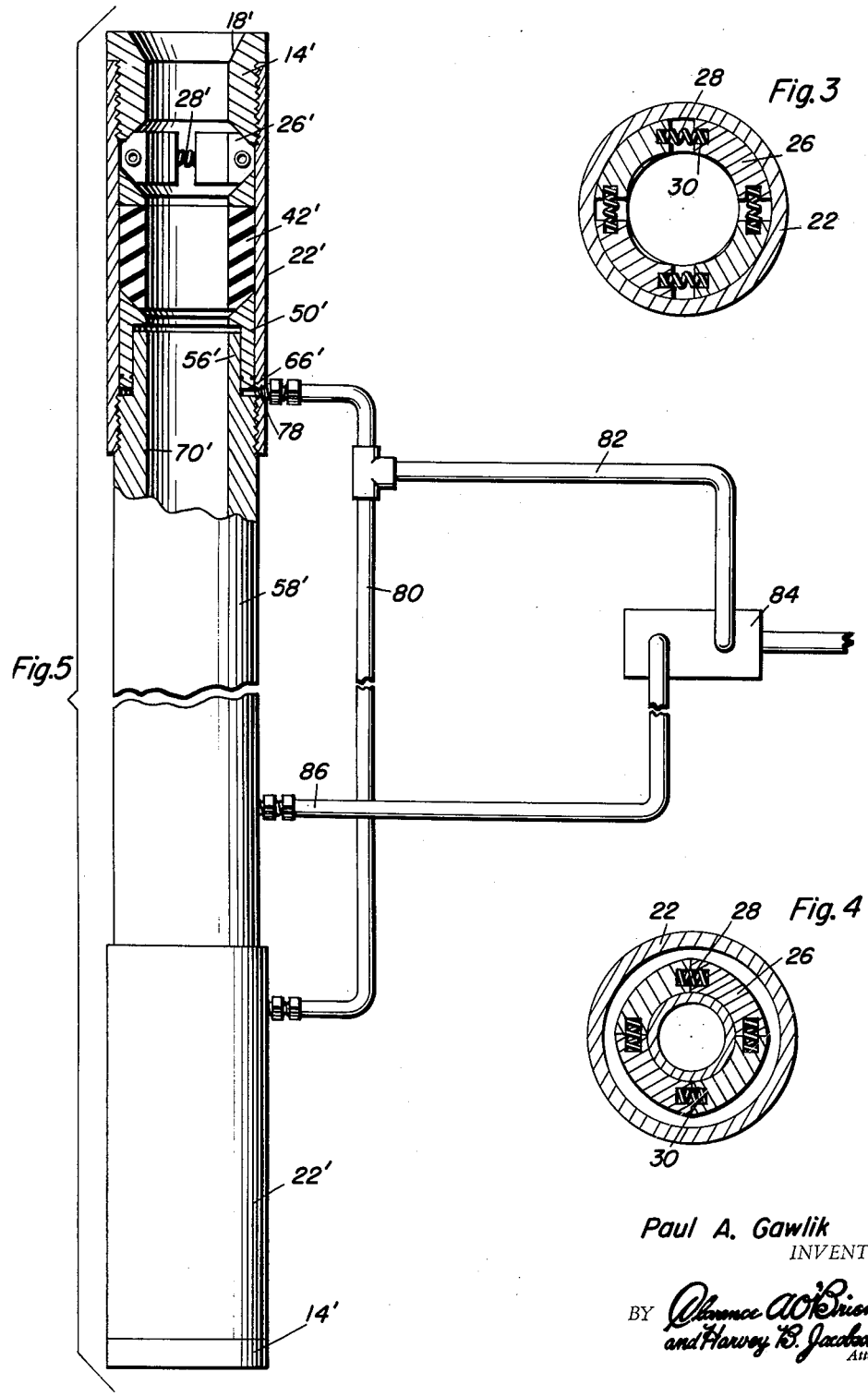

The present invention generally relates to a device in the nature of a tool for testing for leaks in couplings between sections of oil well pipe or tubing and which may be effectively employed for testing coupling joints in any type of pipe intended to carry high pressure gas or liquid with the tool being usable below or above the rig floor or sub-structure and which may be used for testing tubing collars while the pipe is going into a well or while the pipe is being pulled out of the well.

An object of the invention is to provide a tool for detecting pipe leaks in threaded couplings by testing such couplings at the time the pipe sections are assembled and made up above ground level and before they are let down into the oil well thus assuring that the threaded couplings will not leak under high oil and gas pressure.

Another object of the present invention is to provide a tool for detecting pipe leaks which may be bolted or set on the stationary top of the oil well between the oil well and the rig floor thus enabling the pipe to be tested without interfering with the operation of the drilling crew inasmuch as the tool is out of their way below the rig floor.

If there is insufficient room between the rig floor and the top of the oil well, the tool can be suspended by a cable or wire or any other method of support so that the tool may be used when the pipe is being let down into the well or withdrawn from the well.

A further important object of the present invention is to provide a tool in accordance with the preceding objects which is simple in construction, easy to use, adapted for use in various orientations and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical sectional view of the pipe leak detecting tool of the present invention illustrating the construction thereof;

FIGURE 2 is a sectional view similar to FIGURE 1 illustrating the tool sealingly engaged with a pipe on opposite sides of a coupling for testing the coupling for leaks;

FIGURE 3 is a transverse sectional view taken substantially upon a plane passing along section line 3—3 illustrating the orientation of the pipe gripping elements when in unclamped or relaxed condition;

FIGURE 4 is a transverse sectional view taken substantially upon a plane passing along section line 4—4 of FIGURE 2 illustrating the orientation of the pipe gripping elements when in contracted or clamping relation; and FIGURE 5 is a side elevational view with portions thereof being shown in section illustrating the manner in which a complete section of pipe may be tested by elongating the central portion of the tool.

Referring now specifically to the drawings, the numeral 10 generally designates the tool of the present invention. The tool includes a top backup nut 14 having a longitudinal passage 16 therein with a tapered or flared upper end 18 and an inclined lower end 20 which is inclined at 45°. The external surface of the top backup nut 14 is threaded for screw-threaded engagement with an outer cylindrical member 22 with the screw-threaded engagement being designated by the numeral 24.

Disposed against the inclined inner end 20 of the nut 14 is a plurality of arcuate slip clamps 26 which are normally disposed in circumferentially spaced relation. The slip clamps 26 are normally held in circumferentially spaced relation by compression coil springs 28 having the ends thereof received in recesses or pockets 30 in the adjacent end walls of the segments of slip clamps 26. The upper outer corner of the slip clamps 26 is inclined at 45° as designated by the numeral 32 and the lower outer corner is similarly inclined as designated by the numeral 34. The upper inclined edge 32 is in engagement with the lower inclined edge 20 of the backup nut 14. Slidably disposed within the outer cylindrical member 22 and engaging the lower inclined edge 34 is a cone ring 36 having an upper inclined edge 38 complementary to the inclined edge 34 for engagement therewith. Thus by longitudinal movement of the ring 36 towards the nut 14, the slip clamps 26 will be moved laterally from the position illustrated in FIGURE 1 to the position illustrated in FIGURE 2 wherein the slip clamps 26 will be brought into clamping engagement with a pipe 40.

Disposed inwardly of the cone ring 36 and engaging the bottom edge thereof is a cylindrical rubber packer 42 having a longitudinal bore 44 therethrough in alignment with the bore 16 and forming a continuation thereof and also forming a continuation of the bore defined by the slip clamps 26. The lower end of the rubber packer 42 is inclined as designated by numeral 46 for engagement with the inclined edge 48 of a piston 50 which has a longitudinal bore 52 therein in alignment with the bore 44. Longitudinal movement of the piston 50 will not only compress the packer inwardly for gripping engagement with the pipe 40 but will also urge the cone ring 36 longitudinally for bringing the slip clamps 26 into clamping engagement with the pipe 40. The piston 50 is also provided with a longitudinal counterbore or recess 54 telescopically receiving a cylindrical projection 56 on a central cylindrical member 58. The central cylindrical member 58 is screw threadedly connected to the outer cylindrical member 22 as designated by the numeral 60. The central cylindrical member 58 is provided with a tapped radial port 62 which communicates with a longitudinal passage 64 which extends to the annular space 66 between the outer cylindrical member 22 and the projection 56 which is normally occupied by the piston 50 whereby the piston 50 will be forced longitudinally outwardly of the central cylindrical member 58 for compressing the packer 42 and contracting the slip clamps 26. O-ring seals 67 may be provided on the inner and outer surface of the piston 50 where it slidably engages the inner and outer surfaces of the annular space 66 thus effectively sealing the pressure for moving the piston 50.

The central cylindrical member 58 is also provided with a radial tapped port 68 in diametric opposition to the port 62 which is in communication with a longitudinal bore 70 extending through the central cylindrical member 58. The port 62 is connected to a conduit 72 and the port 68 is connected to a conduit 74. The lower half of the tool 10 is symmetrical and has an identical structure to the upper end thereof and these structural elements are designated by the same reference numerals. The pipe coupling which is to be tested is designated in FIGURE 2 by numeral 76 and this coupling 76 is usually of the screw threaded type. The slip clamps 26 are designed to open large enough to permit a large collar on upset tubing to go into the tool as shown in FIGURE 2 and when pressure is applied the clamps will close around a pipe having a minor outside diameter of about three-quarter inch smaller than the major outside diameter of the pipe collar thus sealing off both ends of the tool so the rubber packers cannot push out under high fluid pressure testing. The tool may be suspended by means of wire line, cable, stand or any other means suitable to hold the tool in upright position while testing.

FIGURE 5 of the drawings illustrates an arrangement in which the central cylindrical member 58' is longitudinally elongated and each of the outer cylindrical members 22' is provided with a radial port 78 to which an interconnecting conduit 80 is connected which has a single conduit 82 connected thereto and in turn connected to a valve 84 which will admit pressure for expanding the pistons 50'. The cylindrical member 58' is also provided with a port for receiving a conduit 86 which is also connected to the valve 84 for admitting pressurized fluid into the interior of the cylindrical member 58' for testing an elongated section of pipe disposed therein which will test for pipe leaks and also test for collapse of the tubing or pipe section. The details of the slip clamps 26', backup nuts 14', and rubber packers 42' are all the same as that shown in FIGURE 1 with the only difference being the elongation of the central cylindrical member and the reorientation of the conduit arrangement for admitting pressurized fluid into the annular space 66'.

The overall length of the device illustrated in FIGURE 5 would be equal to a standard length of pipe for collapse testing of one section of pipe. The details of the valve 84 have not been illustrated since any suitable valve construction may be employed having a suitable pressure relief and connected to a pump and gauge with the gauge being provided for measuring pressure drop for detecting any leak in the pipe or pipe coupling.

The arrangement illustrated in FIGURES 2-4 is especially for testing couplings with the test also simulating the conditions under which the pipe will be used when disposed within a well. When the slip clamps are urged into clamping relation and the packer is sealed, the slip clamps and packers will effectively stretch the pipe to simulate the weight on the coupling as if the pipe were hanging in a well and will assure a more accurate test on the threaded coupling for leaks. As fluid from the pump enters through a valve and thence into the annular space 66 a predetermined pressure of about 200 p.s.i. is employed for causing the pistons 50 to move longitudinally outwardly to cause the outer ends of the pistons to compress the rubber packers and shrink them around the minor outside diameter of the pipe with the packers at the same time pressing against the cone rings 36 to press against the slip clamps 26 for closing the slip clamps 26 tightly around the minor outside diameter of the pipe thereby completely sealing off the rubber packer and preventing any possibility of the rubber packer being squeezed or distorted outwardly of the tool. Under this condition, the packers completely seal off the pressure fluid within the tool at about 200 p.s.i. The valve may then admit pressure into the interior of the tool and against the outside surface of the pipe and the coupling or collar. Any amount of pressure desired may be applied to make this test. For instance, if the pipe connection is desired to be tested at 7,000 p.s.i. the pipe coupling or collar is placed in about the center of the tool as shown in FIGURE 2 and pressure is applied by pump to 7,000 p.s.i. The valve may then be closed by hand for sealing off the pressure from the pump or a check valve can be used between the pump and the valve and the pressure is left on for approximately 6 seconds or more to see if a leak in the pipe occurs and a suitable pressure gauge will indicate the drop in pressure caused by the leak. The pressure is relieved by opening the valve for venting the pressure fluid back to a supply tank. When all pressure has been relieved, the rubber packers will come back to normal size and the springs will press the slip clamps back into the same position as original thus leaving the hole open ready to receive another joint of pipe. The tool may be used between a rig floor and the top of a well for testing pipe couplings or collars as the pipe sections are lowered into or taken out of the well thus eliminating any interference with the workers and the tool may be bolted on the oil well by removing the bottom backup nut of the tool and replacing the nut with a flange. The pipe can be marked so the driller can stop the pipe with the mark even with the top of the slip clamps which will place the collar or coupling in the center of the tool. In a matter of only a few seconds, the test can be performed, the pipe may then be lowered to test another collar or coupling without loss of time. If there is inadequate room between the rig floor and the top of the oil well, the tool may be mounted immediately above the rig floor or suspended in any suitable manner for testing the pipe couplings as they are lowered into the well.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tool for detecting pipe leaks and testing pipes for collapse comprising a radially inner central cylindrical member having at each end a longitudinal cylindrical projection of reduced diameter, a pair of outer longitudinally extending cylindrical members connected to said inner cylindrical member and being disposed in spaced concentric relation to the projections on the inner cylindrical member for providing an annular space between each outer cylindrical member and cylindrical projection, a pair of pistons, each piston having a cylindrical portion slidably received within one of said annular spaces, a cylindrical rubber packer disposed in each outer cylindrical member in engagement with the outer end of each piston, a cone ring engaged with the outer end of each packer and slidably received in the outer cylindrical members, a plurality of slip clamps engaged with each cone ring for contraction and expansion upon the longitudinal movement of the cone ring, a backup nut engaged with the outer ends of said slip clamps and rigid with the outer ends of the outer cylinder members whereby longitudinal movement of the piston will cause contraction and expansion of the rubber packer and slip clamps for selectively securely gripping and sealing a pipe on either side of a coupling disposed within the inner central cylindrical member, means for admitting and releasing pressure fluid to the inner ends of the annular spaces for urging the pistons outwardly and permitting inward movement thereof, and means for supplying pressure fluid to the interior of the inner central cylindrical member for testing the pipe coupling for leaks.

2. The combination of claim 1 wherein each of said slip clamps has beveled end edges for engagement with the cone ring, the inner end of the backup nut being beveled and engaged with the beveled end edges of the slip clamps for camming the clamp members inwardly upon longitudinal movement of the cone ring which forces the slip clamps against the backup nut.

3. The combination of claim 2 wherein said slip clamps are spring urged towards an expanded condition.

4. The combination of claim 3 wherein said means for admitting pressurized fluid into the annular space includes a longitudinal passage in the inner central cylindrical member and a radial port communicated with the passage for admitting pressurized fluid.

5. The combination of claim 4 wherein said means for admitting pressurized fluid into the interior of the inner cylindrical member includes a port extending through the inner cylindrical member, and a conduit connecting the port to a supply of pressure fluid.

6. A tool for detecting pipe leaks and testing pipes for collapse comprising a central cylindrical member having at one end a longitudinal cylindrical projection of reduced diameter, an outer longitudinally extending cylindrical member connected to said central cylindrical member and being disposed in spaced concentric relation to the projection on the central cylindrical member for providing an annular space therebetween, a piston having a cylindrical portion slidably received within said annular space, a cylindrical rubber packer disposed within the outer cylindrical member and in engagement with the outer end of the piston, a cone ring engaged with the outer end of the packer and slidably received within the outer cylindrical member, a plurality of slip clamps engaged with the cone ring for contraction and expansion upon longitudinal movement of the cone ring, a back up nut engaged with the outer ends of said slip clamps and rigid with the outer end of the outer cylindrical member whereby longitudinal movement of the piston will cause contraction and expansion of the rubber packer and slip clamps for selectively securely gripping and sealing a pipe disposed within the central cylindrical member, means for admitting and releasing pressure fluid to the inner end of the annular space for urging the piston outwardly and permitting inward movement thereof, and means supplying pressure fluid to the interior of the central cylindrical member for testing the pipe for leaks.

References Cited in the file of this patent

UNITED STATES PATENTS

| | | |
|---|---|---|
| 1,802,525 | Newlin | Apr. 28, 1931 |
| 2,445,876 | Fullerton | July 27, 1948 |
| 2,587,192 | Meyer | Feb. 26, 1952 |
| 2,681,112 | Lee | June 15, 1954 |
| 2,690,224 | Roberts | Sept. 28, 1954 |
| 2,715,444 | Fewel | Aug. 16, 1955 |
| 2,731,827 | Loomis | Jan. 24, 1956 |
| 2,761,311 | Baker | Sept. 4, 1956 |
| 2,841,007 | Loomis | July 1, 1958 |